UNITED STATES PATENT OFFICE.

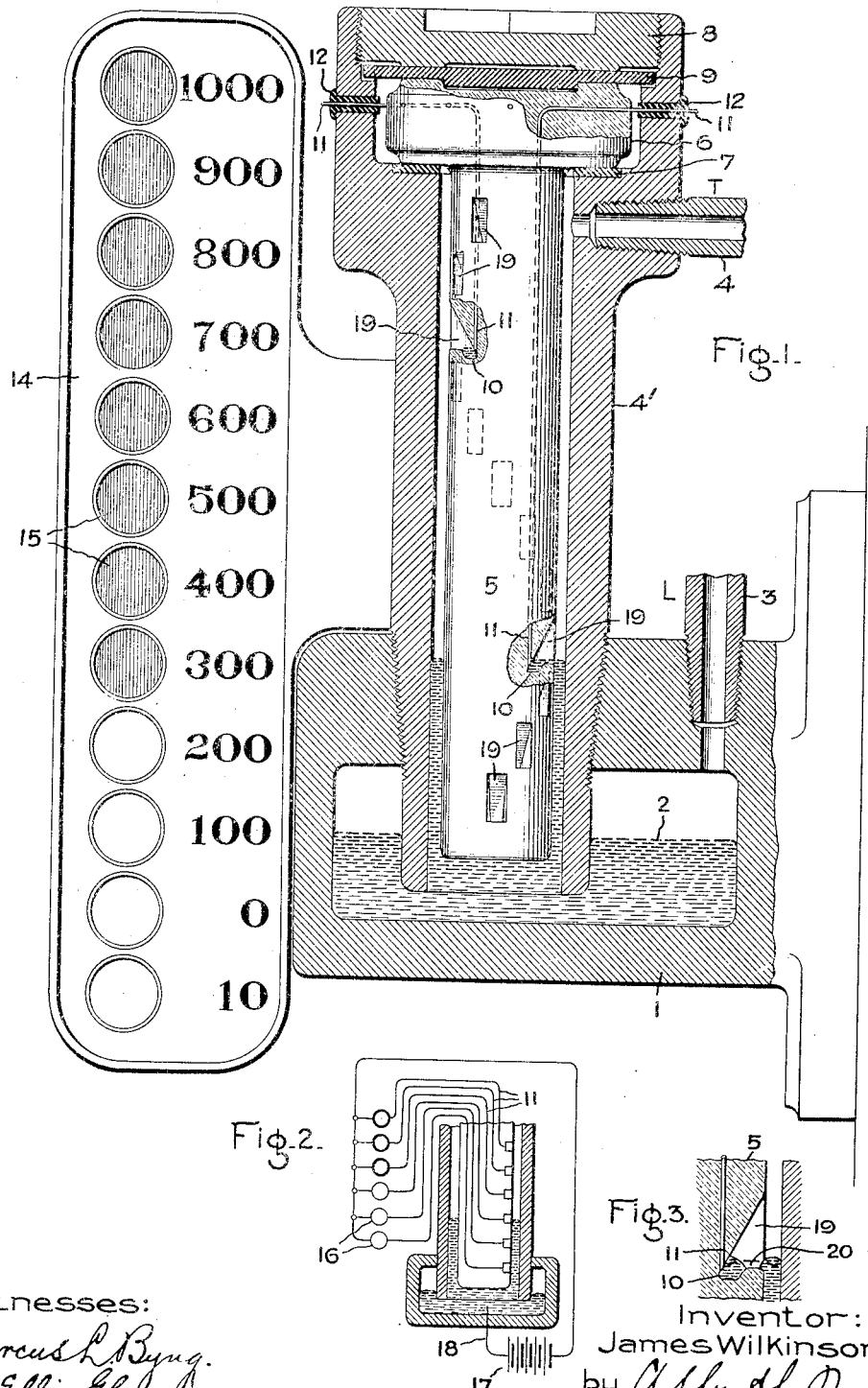

JAMES WILKINSON, OF SCHENECTADY, NEW YORK, ASSIGNOR TO GENERAL ELECTRIC COMPANY, A CORPORATION OF NEW YORK.

ELECTRIC CONTACT-MAKER FOR FLOW-METERS.

1,106,907.
Specification of Letters Patent.
Patented Aug. 11, 1914.

Application filed January 2, 1914. Serial No. 809,855.

*To all whom it may concern:*

Be it known that I, JAMES WILKINSON, a citizen of the United States, residing at Schenectady, county of Schenectady, State of New York, have invented certain new and useful Improvements in Electric Contact-Makers for Flow-Meters, of which the following is a specification.

My invention relates to electric contact makers for measuring instruments wherein it is desired to indicate the height of the column of an electrical conductor, as mercury, by means of closing an electric indicating circuit.

The novel features of my invention are peculiarly adapted for use in connection with flow meters, and I have chosen to illustrate the same as applied to a flow meter, although my invention is not limited to such use.

One object of my invention is to provide a structure wherein each indicating circuit is made and broken by the flowing together and apart of two bodies of mercury, which bodies are respectively in contact with the two terminals of an indicating circuit, thus insuring a good electrical contact, as well as protection for the terminals of the circuit from corrosion.

A further object of my invention is to provide a novel means for causing a quick make and break for the various indicating circuits.

Other objects of my invention, as well as the various structural features thereof will be fully pointed out in the following specification.

Referring to the drawing wherein I have illustrated a form which my invention may take when applied to a flow meter, Figure 1 is a view partly in section and with parts broken away of a flow meter embodying the features of my invention; Fig. 2 is a diagrammatic view showing the arrangement of electric indicating circuits, and Fig. 3 is a sectional view of a detail.

In the drawing a flow meter of the U-tube mercury type is shown having the usual form of casing 1 in which is the body of mercury 2. The leading or high pressure connection is shown at 3 and the trailing or low pressure connection is shown at 4. Inserted in the trailing leg 4' of the U-tube is the contact carrying member 5 here shown in the form of a post of suitable insulating material, as molded porcelain or glass, and supported by a flanged head 6 resting on the yielding bushing or washer 7 located in the enlarged top of the trailing leg of the tube. The post 5 is inserted through the top of the trailing leg and is clamped into place by the screw-threaded plug 8 between which and the head of the post is the yielding disk or plate 9. The post is provided with a plurality of shallow pockets 10 suitably spaced apart longitudinally of the post, and extending down through the post to each pocket is an electrical conductor 11. These conductors extend through suitable insulating bushings 12 to the outside of casing 1 where they may be formed into a suitable cable if desired and led to the indicating instrument 14. This indicating instrument comprises a suitable casing having glass covered openings 15 behind which are arranged electric lights 16. Along the side of the openings are suitable indicia and the circuit wires from the respective pockets are connected in parallel through the corresponding lights 16 to one side of the source of energy 17. The other side of the source of energy is connected to the body of mercury 2 by conductor 18.

Referring particularly to Fig. 3, it will be noted that each shallow pocket 10 is located somewhat within the outer surface of the post in a sort of angular recess 19 and that thus the front edge of the pocket is separated from the outer surface of the post by a short space 20. This space may take any desired contour but I preferably employ a flat horizontal surface. By this arrangement I utilize the surface tension of the mercury to obtain a quick make and break of my indicating circuits, thereby avoiding destructive sparking. I have found by actual tests that when the main body 2 of the mercury is slowly elevated it will rise above the surface 20, and after reaching a certain height will suddenly and quickly flow across the surface 20 into contact with the globule of mercury in the pocket, thereby making a quick and substantial contact. This same action, only in the opposite sense, results when the mercury falls producing a quick break of the circuit. Each of the pockets 10 always contains a small globule of mercury which covers and protects the exposed ends of the conductors 11, the circuit being made and broken between bodies of mercury.

As will be clear, the indicating instrument 14 may be located at any desired point for observation. In the drawing I have shown the same as located adjacent to and carried by the meter casing. This is usually a convenient arrangement. I may however locate the instrument more remote from the casing, or I may use two or more indicating instruments connected either in series or parallel, one being located for instance in the boiler room and the other or others at the switchboard or other desired point or points.

From the above description the operation will be readily apparent. As the mercury 2 rises and falls in the tube the indicating circuits will be successively closed and opened by the mercury contacts to light and extinguish the lamps 16, thereby indicating the height of the mercury in the tube which, in the example illustrated, will be a function of the rate of flow of the fluid being metered.

Although I have shown my contact carrying pockets as being arranged in a separate member inserted into the trailing leg of the U-tube, it will, of course, be understood that I am by no means limited to this specific arrangement, the scope of my invention being defined by the appended claims.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a measuring instrument, a casing, a body of mercury therein, means communicating with said casing which defines a vertical passage in which the mercury rises and falls, said means having a series of vertically spaced pockets containing mercury arranged therein, and electrical conductors leading to said pockets.

2. In a measuring instrument, a casing, a body of mercury therein, means communicating with said casing which defines a vertical passage in which the mercury rises and falls, said means having arranged therein a series of vertically spaced pockets containing mercury, the pockets being set in from the surface of said means and separated therefrom by a short surface, and electrical conductors leading to said pockets.

3. In a measuring instrument, a casing, a body of mercury therein, a tube communicating with said casing in which said mercury rises and falls, a contact carrying member arranged within said tube having pockets containing mercury formed therein, and electrical conductors terminating in said pockets.

4. In a measuring instrument, a casing, a body of mercury therein, a tube communicating with said casing in which said mercury rises and falls, a contact carrying member supported in said tube having recesses formed therein with pockets containing mercury in the bases of said recesses, said pockets being spaced from the outer surfaces of the support and connected thereto by short surfaces, and electrical conductors terminating in said pockets.

5. In a flow meter, a casing, a body of mercury therein, a tube having an enlarged head communicating with said casing and forming the trailing leg thereof in which the mercury rises and falls, a contact carrying member having a flanged end inserted in said tube with the flanged end resting in said enlarged head, means for clamping the flanged end therein, a series of vertically arranged pockets containing mercury in the contact carrying member, and circuit wires leading to said pockets.

6. The combination in a measuring instrument wherein the height of a column of mercury is indicated at a distance by means of the mercury closing an indicating circuit, of means for causing a quick make and break of such indicating circuit comprising a member along the surface of which the mercury moves having a pocket formed therein, the edge of said pocket being spaced inward from the surface of the member and connected thereto by a short horizontal surface.

In witness whereof, I have hereunto set my hand this twenty-ninth day of December, 1913.

JAMES WILKINSON.

Witnesses:
H. B. NUGENT,
A. K. NUGENT.